United States Patent
Kuitunen et al.

(10) Patent No.: US 10,480,683 B2
(45) Date of Patent: Nov. 19, 2019

(54) VALVE AND CLOSURE MEMBER

(71) Applicant: METSO FLOW CONTROL OY, Vantaa (FI)

(72) Inventors: Antti Kuitunen, Espoo (FI); Sampo Rosenberg, Helsinki (FI); Pietari Luoto, Kirkkonummi (FI); Tarmo Laitinen, Helsinki (FI); Tommi Bergström, Järvenpää (FI); Jari Ruhanen, Vantaa (FI); Robbie Beehler, Fargo, ND (US); Bob Jenson, Detroit Lakes, MN (US); Kyle Kraning, West Fargo, ND (US); Nick Kunz, Fergus Fall, MN (US)

(73) Assignee: METSO FLOW CONTROL OY, Vantaa (FI)

( * ) Notice: Subject to any disclaimer, the term of this patent is extended or adjusted under 35 U.S.C. 154(b) by 31 days.

(21) Appl. No.: 15/729,303

(22) Filed: Oct. 10, 2017

(65) Prior Publication Data
US 2019/0107227 A1    Apr. 11, 2019

(51) Int. Cl.
| F16K 47/04 | (2006.01) |
| B33Y 80/00 | (2015.01) |
| F16K 5/12 | (2006.01) |
| F16K 5/06 | (2006.01) |

(52) U.S. Cl.
CPC .......... *F16K 47/045* (2013.01); *B33Y 80/00* (2014.12); *F16K 5/0605* (2013.01); *F16K 5/12* (2013.01)

(58) Field of Classification Search
CPC ......... F16K 5/0605; F16K 5/12; F16K 47/045
See application file for complete search history.

(56) References Cited

U.S. PATENT DOCUMENTS

| 1,333,048 | A | * | 3/1920 | Webster | ............... | A62C 31/005 |
| | | | | | | 137/625.32 |
| 3,023,783 | A | * | 3/1962 | Vickery | .............. | F16K 31/1635 |
| | | | | | | 137/625.12 |
| 4,212,321 | A | * | 7/1980 | Hulsey | .................. | F16K 5/0615 |
| | | | | | | 137/625.32 |
| 4,881,718 | A | * | 11/1989 | Champagne | .......... | F16K 5/0605 |
| | | | | | | 251/209 |
| 4,889,163 | A | * | 12/1989 | Engelbertsson | ...... | F16K 5/0605 |
| | | | | | | 137/625.32 |
| 5,180,139 | A | * | 1/1993 | Gethmann | ............ | F16K 5/0605 |
| | | | | | | 137/625.32 |
| 5,287,889 | A | * | 2/1994 | Leinen | .................. | F16K 5/0605 |
| | | | | | | 137/625.3 |
| 5,332,004 | A | * | 7/1994 | Gethmann | ............ | F16K 5/0605 |
| | | | | | | 137/625.32 |
| 5,511,584 | A | * | 4/1996 | Leinen | .................. | F16K 5/0605 |
| | | | | | | 137/625.3 |

(Continued)

*Primary Examiner* — Reinaldo Sanchez-Medina
(74) *Attorney, Agent, or Firm* — Oliff PLC

(57) ABSTRACT

The invention relates to a valve having an inlet and an outlet, and a closure member. The closure member comprises an inlet area with a plurality of inlet openings and an outlet area. Main flow channels extend from initial openings in the inlet area through the closure member to openings in the outlet area, said initial openings are located in an initial flow inlet area of the inlet area which is first subjected to fluid from the inlet of the valve when the closure member is rotated from a fully closed position towards an initially open position.

11 Claims, 3 Drawing Sheets

(56) References Cited

U.S. PATENT DOCUMENTS

| | | | | |
|---|---|---|---|---|
| 5,524,863 | A * | 6/1996 | Davis | B08B 9/00 |
| | | | | 137/625.32 |
| 5,680,889 | A * | 10/1997 | Boger | F16K 5/12 |
| | | | | 137/625.32 |
| 5,771,929 | A * | 6/1998 | Boger | F16K 5/0605 |
| | | | | 137/625.32 |
| 6,974,116 | B1 * | 12/2005 | Christenson | F16K 5/0605 |
| | | | | 137/625.32 |
| 7,156,122 | B2 * | 1/2007 | Christenson | F16K 5/0605 |
| | | | | 137/625.32 |
| 2006/0185740 | A1 * | 8/2006 | DePierri | B01J 8/002 |
| | | | | 137/547 |
| 2007/0034267 | A1 * | 2/2007 | Partridge | F16K 5/0605 |
| | | | | 137/625.32 |
| 2016/0123479 | A1 * | 5/2016 | Keller | F16K 47/02 |
| | | | | 251/309 |

\* cited by examiner

VALVE AND CLOSURE MEMBER

BACKGROUND OF THE INVENTION

Field of the Invention

This invention relates to a valve and to a closure member of a valve.

Description of Prior Art

Previously there is known a valve having a closure member arranged between an inlet and an outlet of the valve. The closure member is rotatably arranged in the valve such that it may be moved between a closed position and an open position. An inlet surface in the closure member is provided with an inlet opening for receiving a flow, which is passed on via an outlet surface of the closing member. The amount of fluid which can pass through the valve depends on the angle into which the closure member is rotated and on the geometry of the closure member.

A problem with the known solution relates to the pressure difference which is generated between the inlet and outlet side of the valve while the closure member is restricting flow from the inlet to the outlet.

Flow velocity is increased within closure member and outlet because of decreased flow area causing high velocity jet flow. This can lead to noise problems with compressible fluids. High flow velocity will lead to low pressure and with liquid fluids this can lead to cavitation problems. With particles in flow media erosion problems may arise. Flow velocity distribution is dependent on closure member design. At outlet in case of flow separation there are strong vortices which cause low pressures and flow instabilities and may lead to also mechanical vibration accompanied with other aforementioned problems.

SUMMARY OF THE INVENTION

An object of the present invention is to solve the above-mentioned drawback and to provide a solution which makes it possible to efficiently control a flow through a valve as efficiently smoothly as possible. This object is achieved with a valve according to independents claim 1 and 10 and with a closure member according to independent claim 15.

By providing the closure member with an initial flow area which is first subjected to fluid when the closure member is rotated from the fully closed position towards an initial open position, with an initial flow outlet area which is arranged to discharge flow when the closure member is rotated from the fully closed position towards the initial open position it becomes possible to obtain a first initial flow in a controlled way along a controlled path such that problems caused by large pressure differences can be efficiently handled.

Preferred embodiments of the invention are disclosed in the dependent claims.

BRIEF DESCRIPTION OF DRAWINGS

In the following the present invention will be described in closer detail by way of example and with reference to the attached drawings, in which.

DESCRIPTION OF AT LEAST ONE EMBODIMENT

Figure 1:
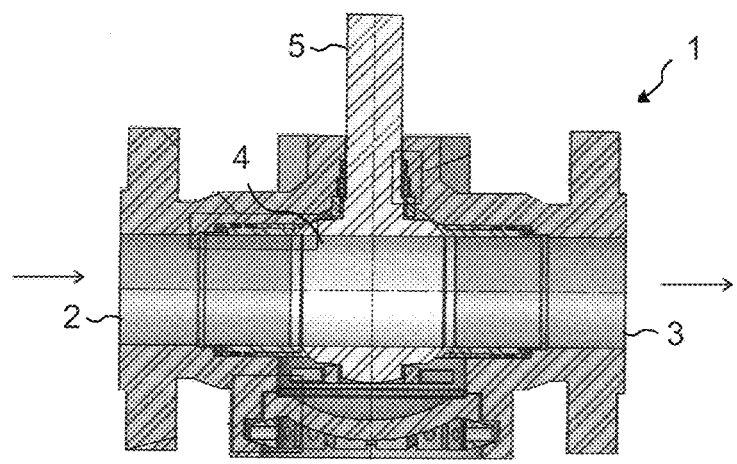
FIGS. 1 to 5 illustrate a first embodiment of a valve.

FIGS. 1 to 5 illustrate a first embodiment of a valve 1. The valve 1 is in this example assumed to be a ball valve with an inlet 2 and an outlet 3. A closure member 4 is rotatably arranged in the valve 1 to be moved between a fully closed position preventing flow from the inlet 2 to the outlet 3 and a fully open position allowing flow from the inlet 2 to the outlet 3. Rotation of the closure member 4 may be implemented via a shaft 5, for instance.

Figure 2:
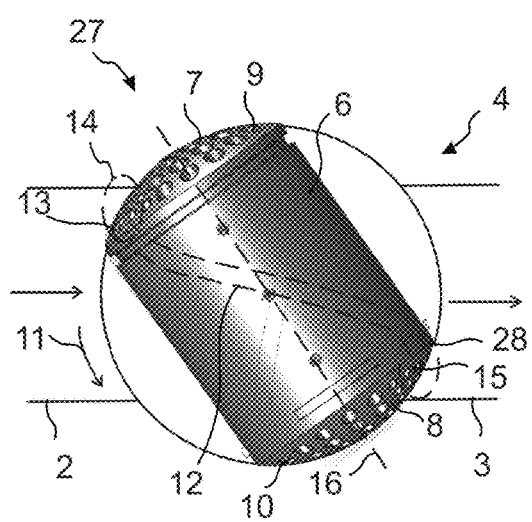

FIG. 2 illustrates the closure member 4 as seen from above, such as in the direction of the shaft 5. In the illustrated example the flow paths through the closure member 4 are by way of example illustrated as being arranged in an generally cylindrical part 6 of the closure member 4. The cylindrical part 6 can be removable or fixed insert. Alternatively, the flow paths may also be directly arranged in the spherically shaped closure member 4 in which case full internal volume of the closure member may be utilized.

The closure member 4 comprises a flow inlet area 27 with an initial flow inlet area 14 and a main inlet flow area 7. The main inlet flow area 7 is provided with at least one main opening 9. In the illustrated example a plurality of main openings 9 are arranged to receive a flow from the inlet 2. The flow inlet area 27 is also illustrated in more detail in FIG. 3. The flow received via the inlet openings is passed on to the outlet 3 of the valve via openings a flow outlet area 8.

In FIG. 2 the closure member 4 is illustrated in a position where it has been rotated in the direction of arrow 11 from the fully closed position where the flow from the inlet 2 to the outlet 3 has been completely cut off towards an initial open position. In the illustrated position the closure member 4 allows only a very small minimum amount of flow from the inlet 2 to the outlet 3. This flow takes place via at least one initial opening 13 in the initial flow area 14 and at least one initial flow channel 12 guiding flow from the initial flow inlet area 14 to an opening 15 in an initial flow outlet area 28 of the flow outlet area 8. The initial opening 13 is located in a part of the flow inlet area 27, in other words in the initial flow inlet area, which is first subjected to fluid from the inlet 2 of the valve when the closure member is rotated from the fully closed position towards the illustrated initial open position.

From FIG. 2 one can see, that the initial flow channel 12 is shaped to turn the direction of the flow received from the initial opening 13 before passing on the flow via opening 15 in the initial flow outlet area 28. In the illustrated example the initial flow channel 12 has a helical shape such that the initial flow channel 12 extends at least partly around a center axis 16 of the closure member 4. The helical shape may be such that it extends along the entire length of the initial flow channel or alternatively it may extend only along a part of the initial flow channel. The helical shape may be such that it has a constant radius or alternatively a radius which varies, for instance. Similarly also the pitch of the helix may be constant or vary between different parts of the channel. The center axis 16 in this connection refers to a hypothetical line which extends from a center point of the flow inlet area 27 to a center point of the flow outlet area 8. Consequently, the initial flow channel 12 provides a controlled flow path for fluid starting from the moment when the closure member 4 is turned into a position allowing a small minimum flow from the inlet 2 to the outlet 3.

Figure 3:
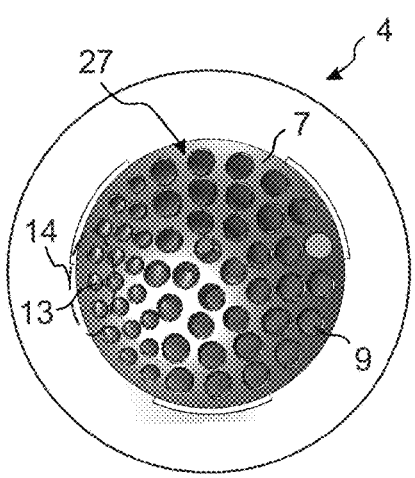

FIG. 3 is a front view of the inlet area 27 of the closure member 4.

From FIG. 3 it can more clearly be seen that in the initial flow inlet area 14 more than one initial opening 13 may be arranged. Each initial opening may pass a flow to a corresponding initial flow channel 12 which opens up into one single initial flow channel specific opening 15 in the outlet area 8. Consequently, flow from different initial flow channels 12 may be prevented from being mixed. From FIG. 3 it can also be observed that the diameter of the initial inlet opening 13 is smaller that the diameter of the main openings 9 arranged in the main inlet flow area 7 of the inlet area 27. This makes adjustment of the flow more precise as it becomes possible to ensure that a small turn of the closure member initially opens up only a small flow through the closure member.

Though not illustrated in the figures, it is possible that one or more of the initial flow channels (or of the main flow channels) is branched off into several sub channels in an area between the openings 13 and 15 in the and the inlet flow area 27 and the outlet area 8. In that case these sub channels may be united to one single channel before reaching the opening 15 in the outlet area 8. Alternatively, the sub channels may end up at different openings in the outlet area.

Figure 4:
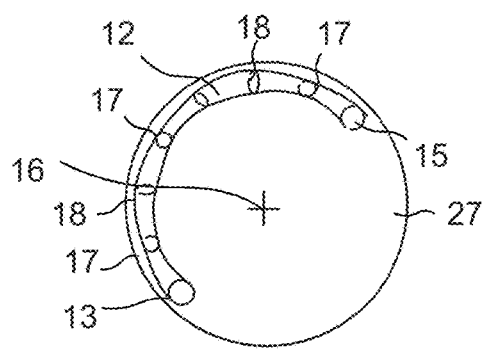

Also FIG. 4 illustrates a front view of the inlet area 27 of the closure member 4. However, for clarity, the only opening illustrated in FIG. 4 is the initial inlet opening 13. Similarly the shape of only one initial flow channel 12 extending from the initial inlet opening 13 to the opening 15 in the outlet area 8 is illustrated.

From FIG. 4 it can be seen that the helically shaped initial flow channel 12 extends about 180° around the center axis 16. The angle is preferably approximately of this size, as this ensures that once the closure member is rotated to the position illustrated in FIG. 2 where the initial inlet opening 13 is revealed and subjected to receive fluid from the inlet 2, simultaneously the opening 15 in the initial flow outlet area 28 of the same initial flow channel 12 is revealed towards the outlet 3 ensuring that the flow may freely pass through this initial flow channel. It should be observed, that in case the initial flow channel 12 makes one or more complete turns around the center axis 16, in other words extends more than 180° around the center axis, then preferably the angle is such selected that the initial inlet opening 13 is approximately on the opposite side of the center axis 16 than the opening 15. Suitable angles are in that case approximately: 540°, 900° and 1260°, for instance. Flow channels which are as long as possible and which turn the flow during pass through the channels are advantageous, because such channels are efficient in handling pressure differences between the inlet and outlet side of the valve in a way that results in a more smooth flow without generating excess sound or cavitation.

The initial flow channel 12 has a cross sectional flow area which varies with smooth transitions in different parts of initial flow channel. As illustrated in FIG. 4 at locations 17 the cross-sectional flow area is smaller than at other locations. Additionally, though the initial inlet opening 13 and the outlet opening 15 have a circular round shape, this is not the case for the entire initial flow channel. Instead at locations 18 the shape of the cross section of the primary flow channel 12 is elliptical. Such variations in the dimension and shape of the initial flow channel, which in the illustrated embodiment have been implemented as smooth transitions, makes it possible to divide the closure member into several small stages and to obtain pressure staging such that the pressure of the flowing fluid drops in stages. This is advantageous as the risk of cavitation, noise and erosion, for instance, can be minimized. Preferably also the other channels of the closure member have a similar shape.

Figure 5:
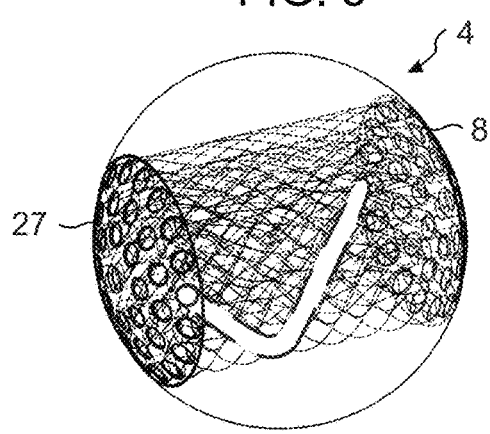

FIG. 5 is a simplified illustration of all the flow channels of the closure member 4. From this figure one can see that in this example all channels extending between the inlet area 27 and outlet area 8 have a helix shape. The result is a closure member capable of efficiently handling large pressure variations from the inlet side to the outlet side by minimizing cavitation and noise. The direction of the helix shape is not necessary the same for all channels (clockwise/counter clockwise), but may vary between the different channels. Also the radius or pitch of the channels and the cross sectional shape of the channels may vary.

In order to to work efficiently the shape of the flow channels in the embodiment of FIGS. 1 to 5 is preferably as smooth as possible, which reduces cavitation, noise and erosion. In transitions between channel cross sections the tangent of the curvature does preferably not have any discontinuities. Additionally the surfaces of the channels should be solid and fluid tight. Such a solution can not be obtained by stacking suitably perforated discs against each other, for instance, because this does not result in channels which are smooth enough to prevent unwanted flow separation. Additionally gaps between stacked discs cause disturbances in the flow. Instead a preferred way of manufacturing the closure member with such smooth flow channels is additive manufacturing. In that case the entire closure member may be 3D printed to one single solid piece with the above described flow channels, or a separate insert, which may be attach to a closure member body manufactured traditionally, may be 3D printed.

FIGS. 6 and 7a to 7d illustrate a second embodiment of a valve. The embodiment of FIGS. 6 and 7a to 7d is very similar as the one explained in connection of FIGS. 1 to 5. Therefore, the embodiment of FIGS. 6 and 7a to 7d will mainly be explained by pointing out the differences.

Figure 6:
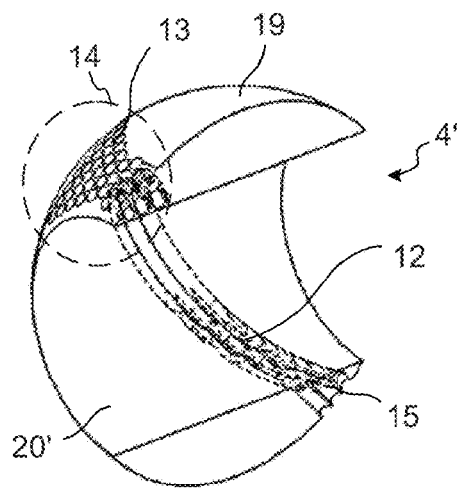
FIGS. 6 and 7a to 7d illustrate a second embodiment of a valve.

For clarity, FIG. 6 illustrates only a half of the closure member 4'. Similarly, as in the previous embodiment, the closure member 4' is provided with initial inlet openings 13 in the initial flow area 14 which is first subjected to fluid from the inlet 2 of the valve when the closure member 4' is rotated from the completely closed position towards the initial open position. From these initial inlet openings 13 the initial flow channels 12 extend to outlet openings 15 in the initial flow outlet area 28 of the closure member 4'. The initial flow channels extend close to the outer periphery 19 of the closure member 4' and they may be shaped and dimensioned as explained in the previous embodiment of FIGS. 1 to 5.

In FIGS. 6 and 7a to 7d the closure member 4', however, comprises one single main flow channel 20' having a larger cross sectional flow area than the initial flow channels 12. The diameter of the main flow channel 20' may be the same of the pipes to which the valve is connected, for instance. An advantage with such a "full bore" solution is that it makes "Pigging" possible, which refers to cleaning of pipelines by passing a cleaning tool trough the pipeline. In FIG. 6 the initial flow channels 12 have been marked by dotted lines in order to illustrate that they are embedded in the walls of the closure member 4'. Consequently, flow of fluid out from the initial flow channels 12 into the main flow channel 20' is prevented in this particular embodiment, though such flow from the initial flow channels to the main flow channel may be allowed in other implementations. An advantage with the solution shown in FIG. 6 is that it makes it possible to utilize a full bore main flow channel simultaneously as the initial flow channels facilitate efficient control of the flow during initial opening of the valve and efficient noise reduction.

Similarly, as in the previous embodiment, once the closure member 4' is rotated from a closed position towards an open position, initially it is the initial openings 13 and the initial flow channels 12 which are first subjected to fluid from the inlet 2 and pass on the fluid flow via openings 15 in the initial flow outlet area 28 to the outlet 3, as will be explained in more detail in connection with FIGS. 7a to 7D.

FIGS. 7a to 7d illustrate opening of the valve starting from a situation where the closure member 4' is initially in a fully closed position and ending in a situation where the closure member 4' has reached a fully open position. In this example the valve is of a type referred to as an over quarter turn control valve. Consequently, the closure member rotates more than 90° within the valve between the fully closed position and the fully open position. For simplicity, however, only one primary inlet opening 13, one primary flow channel 12 (shaped as a helix) and one outlet opening 15 is illustrated in FIGS. 7a to 7d.

Figure 7A:
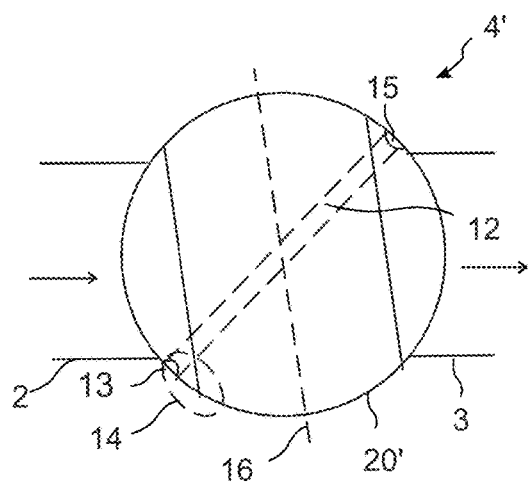

In the situation illustrated in FIG. 7a, the closure member is in the fully closed position. From FIG. 7a one can see that the initial inlet opening 13 is not yet facing the inlet 2, and consequently a sealing of the valve (not illustrated) prevents fluid from the inlet from reaching the initial inlet opening at this stage. From FIG. 7a one can also see, that the main flow channel 20' is also turned into a position where fluid from the inlet 2 can not reach the main flow channel 20'. In fact, the closure member is at this stage turned into a position where the center axis 16 is at an angle which is −9°, consequently "overturned" from a position where it would be perpendicular in relation to the longitudinal direction of the flow between the inlet 2 and the outlet 3.

Figure 7B:
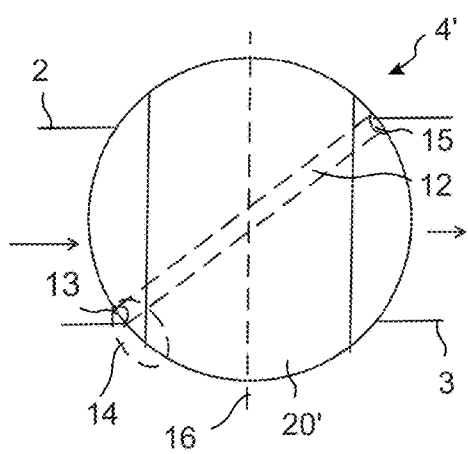

In the situation of FIG. 7b the closure member 4' has been rotated from the fully closed position to an initial open position. At this stage the center axis 16 is at an angle which is 0°, consequently the center axis is now perpendicular in relation to the longitudinal direction of flow between inlet 2 and outlet 3. At this stage fluid already reaches the initial opening 13 and flow takes place via the initial flow channel 12. The main flow channel 20' is still turned away from the inlet 2 (and outlet 3) and consequently the initial flow occurs only via the initial flow channel 12. In this way the initial opening of the valve by turning the closure member 4' can be done in a controlled and precise way without allowing a sudden initial grow in the amount of fluid passing through the valve.

Figure 7C:
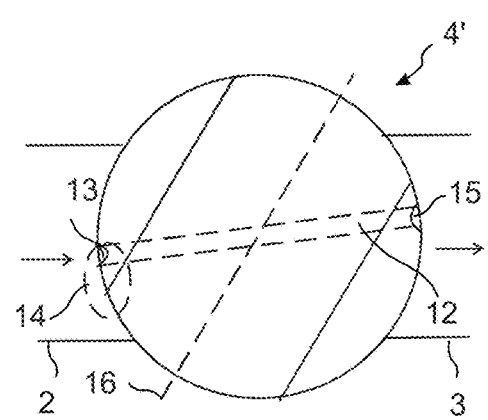

FIG. 7c illustrates the situation where the closure member 4' has been rotated further from the initial open position of FIG. 7b towards a fully open position. At this stage the center axis 16 is at an angle which is 30°. At this stage fluid already reaches the main flow channel 20'. Consequently, flow takes place via the initial flow channel 12 and the partially open main flow channel 20'.

Figure 7D:
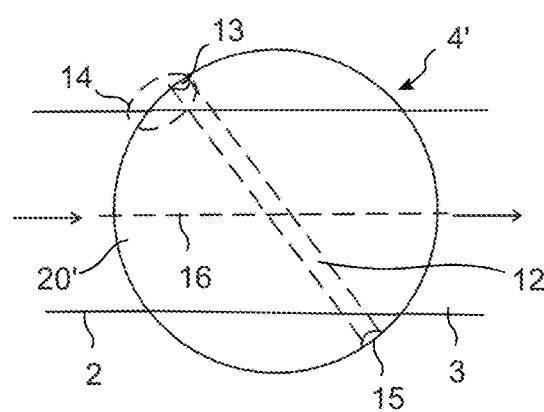

FIG. 7d illustrates the situation where the closure member 4' has been rotated further from the position in FIG. 7c, such that the closure member has reached the fully open position. At this stage the center axis is at angle which is 90°. Consequently, the center axis 16 is now in line with the longitudinal direction of flow between inlet 2 and outlet 3. At this stage the main flow channel 20' is fully open and flow may freely occur trough it. However, the initial flow channel 12 is at this stage blocked by the sealing of the valve (not illustrated) as it has been turned to a position where it is now longer facing the inlet and fluid can therefore no longer reach the initial opening 13.

When comparing the embodiment of FIGS. 6 and 7a to 7d with the previous embodiment, one can observe that the initial flow inlet area 14 with at least one primary inlet opening 13 is located much more on the side surface of the closure member 4' than in the previous embodiment. In fact, though the closure member 4' in FIG. 7b is illustrated in a position where the centrally arranged flow channel 20' is still about 90° turned in relation to the direction between the inlet 2 and outlet 3, flow through the primary fluid channels 12 is already possible.

An advantage obtained by utilizing a valve where the closure member is arranged to be turned more than 90° from the fully open position (FIG. 7d) to before reaching the fully closed position (FIG. 7a) is that the "dead angle" of the valve can be utilized. In other words, in known valves the closure member can be turned for several degrees from the fully closed position before any kind of flow through the valve occurs. This dead area can not be minimized and taken into use to obtain a more precise flow adjustment during initial opening of the valve.

It is possible to arrange the openings in the closure member in such a way, for instance, that from the fully closed position the closure member can be rotated more than 10° before the main flow channel 20' allows flow from the inlet 2 to the outlet 3. However, much earlier flow via the at least one initial fluid channel becomes possible. Such a solution efficiently reduces the dead angle of the valve, in other words the part of the rotation of the closure member before any fluid flow starts.

Figure 8:
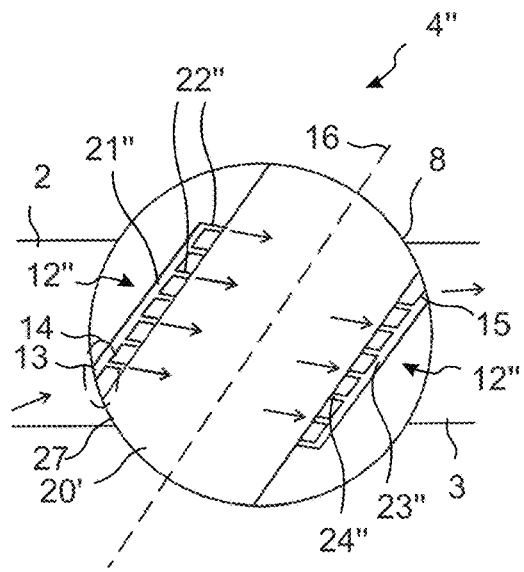
FIGS. 8 and 9 illustrate a third embodiment of a valve.
Figure 9:
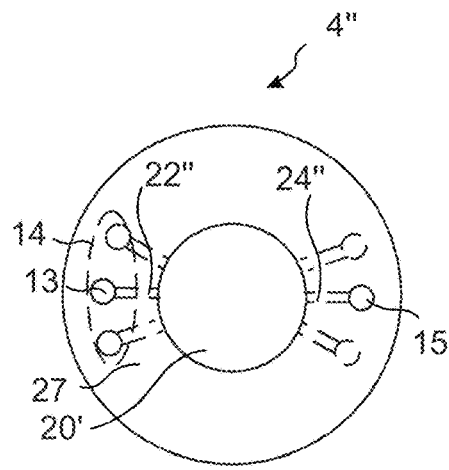

FIGS. 8 and 9 illustrate a third embodiment of a valve. The embodiment of FIGS. 8 and 9 is very similar as the two embodiments previously explained. Therefore the embodiment of FIGS. 8 and 9 will mainly be explained by pointing out the differences. FIG. 8 illustrates a cross section of a closure member 4" as seen from above and FIG. 9 illustrates a front view of the closure member.

In FIGS. 8 and 9 the inlet area 27 is provided with one single main flow channel 20' extending along a center axis 16 of the closure member 4" and with initial inlet openings 13 in a initial flow area 14 of the inlet area 27 which is first subjected to fluid when the closure member 4" is rotated from a fully closed position towards the fully open position. The initial flow channels each have a smaller cross sectional flow area than the main flow channel.

The initial flow channels 12" have a first part 21" extending from the initial openings 13 along the main flow channel 20'. The first parts 21" are branched off within the closure member (before reaching the outlet area 8) into a plurality of second parts 22" providing a flow path between each first part and the main flow channel 20". From the main flow channel 20" the fluid may continue to the outlet 3 directly via the main flow channel.

In some embodiments (though not necessarily in all implementations) the closure member may be provided with additional channels as is the case in the example illustrated in FIGS. 8 and 9. In this example a third part 23" extends along the main flow channel 20" to an opening 15 in the outlet are 8. The third part does, however, not extend all the way to the outlet area. The third part 23" is connected to the main flow channel 20" via a plurality of fourth parts 24".

Consequently, as in the previous embodiments, the initial flow channels 12' are shaped to turn the direction of the flow received via the initial inlet openings 13 before passing on the flow via the outlet area 8. In this way the initial flow channels become longer and their walls have more contact with the fluid, which is advantageous in order to avoid generation of noise and cavitation, for instance.

Additionally, if the initial flow channels 12″ are provided also with the third parts 23″ and fourth parts 24″ (not necessary in all embodiments) the fact that fluid may leave the main flow channel 20' via the third parts 23″ and fourth parts 24″ minimizes disturbances caused by fluid hitting this part of the side wall of the main flow channel 20'.

Figure 10:
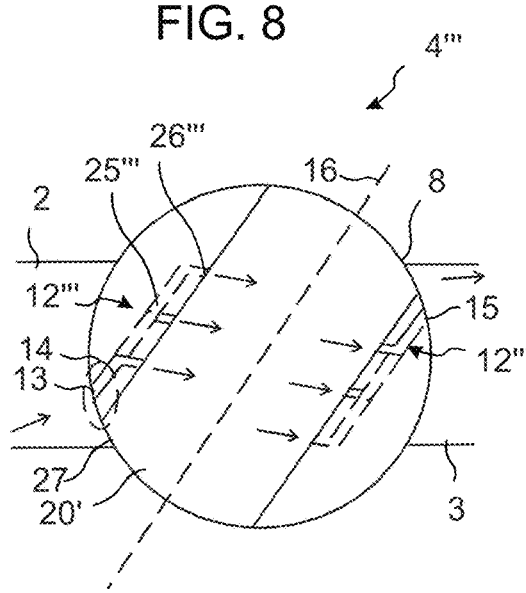
FIG. 10 illustrates a fourth embodiment of a valve and FIG. 11 illustrates a fifth embodiment of a valve.

FIG. 10 illustrates a fourth embodiment of a valve. The embodiment of FIG. 10 is very similar as the embodiment of FIGS. 8 and 9. Therefore the embodiment of FIG. 10 will mainly be explained by pointing out the differences.

In FIG. 10 the initial flow channels 12'″ have been shaped slightly differently than in FIGS. 8 and 9. In Figure to the initial flow channels 12'″ have a fifth part 25'″ extending from the initial inlet opening 13 along the main flow channel 20'. In this embodiment the initial flow channels 20' are arranged in different layers (on different heights within the closure member) so that they are partially located on top of each other. However, the length of the fifth parts 25' of the different initial flow channels 20' varies from one initial flow channel to an other. Additionally, in this embodiment the initial flow channels have a a sixth part 26'″ interconnecting each respective fifth part 25'″ with the main flow channel 20'. In this way fluid may enter the closure member via the initial inlet opening 13 and exit the enclosure member from the outlet area via the main channel 20'. Alternatively, but not necessarily in all embodiments, in a similar way as has been illustrated in connection with FIGS. 8 and 9, the flow can exit from the main channel 20' from the opening 15 in the outlet area 8 to the outlet 3.

Figure 11:
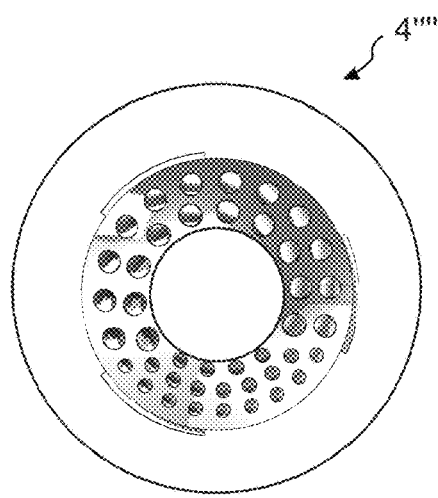

FIG. 11 illustrates a fifth embodiment of a valve. The embodiment illustrated in FIG. 11 is very similar to the one explained in connection with FIGS. 1 to 5. Therefore, the embodiment of FIG. 11 will mainly be explained by pointing out the differences.

When comparing FIGS. 3 and 11 with each other, one can observe that the main difference between these embodiments is that in FIG. 11, the closure member 4″″ is provided with a large main flow channel extending straight through the closure member. In addition, as illustrated by way of example, the closure member may have a plurality of smaller sized main flow channels.

It is to be understood that the above description and the accompanying figures are only intended to illustrate the present invention. It will be obvious to a person skilled in the art that the invention can be varied and modified without departing from the scope of the invention.

The invention claimed is:

1. A valve having an inlet and an outlet, and a closure member which is rotatably arranged in the valve to be moved between a fully closed position and a fully open position so as to control flow of a fluid from the inlet to the outlet of the valve; said closure member comprising: a flow inlet area and a flow outlet area; the flow inlet area comprising: an initial flow inlet area having at least one initial opening which is first subjected to fluid from the inlet of the valve when the closure member is rotated from the fully closed position towards an initial open position, and a main inlet flow area having at least one main opening which is subjected to fluid from the inlet after the at least one initial opening has been subjected to fluid and the closure member is rotated further from the initial open position towards the fully open position of the closure member; the flow outlet area comprising: an initial flow outlet area which is arranged to first discharge flow to the outlet of the valve when the closure member is rotated from the fully closed position towards the initial open position, and a main outlet flow area which is arranged to discharge flow when the closure member is rotated further from the initial open position towards the fully open position; at least one main flow channel extending from the main inlet flow area to the main flow outlet area allowing flow from the inlet of the valve through the closure member to the outlet of the valve; and at least one initial flow channel, different from the at least one main flow channel, having a helical shape, located within the closure member and extending closest to an outer periphery of the closure member for guiding flow from the initial flow inlet area to the initial flow outlet area.

2. A valve according to claim 1, wherein, said closure member is arranged to be turned more than 90° from the fully open position before reaching the fully closed position.

3. A valve according to claim 1, wherein the at least one initial flow channel and the at least one main flow channel are formed in an insert arranged to the closure member.

4. The valve according to claim 1, wherein at least one of the at least one initial flow channel has a cross sectional flow area which varies in different parts of the at least one initial flow channel.

5. The valve according to claim 1, wherein at least one of the at least one initial flow channel has a cross sectional flow area which varies with smooth transitions in different parts of the at least one initial flow channel.

6. The valve according to claim 1, wherein the at least one initial flow channel has at least one branch providing a secondary flow path to at least one main flow channel.

7. The valve according to claim 1, wherein the closing member has a plurality of initial flow channels each having a smaller cross sectional flow area than at least one main flow channel, said initial flow channels extending from the initial inlet opening along at least one main flow channel and opening up into the at least one main flow channel, at least two of said initial flow channels have a different length.

8. A valve according to claim 1, wherein the initial flow inlet area is provided with openings having a smaller cross sectional area than openings provided in the main inlet flow area.

9. The valve according to claim 1 wherein the closure member consists of one single solid piece.

10. The valve according to claim 1, wherein the at least one main flow channel has a helical shape.

11. The valve according to claim 1, wherein the at least one initial flow channel with said helical shape extends at least partly around a center axis of the closure member.

* * * * *